(12) United States Patent
Zeleznik et al.

(10) Patent No.: US 12,377,805 B2
(45) Date of Patent: Aug. 5, 2025

(54) LOW-POWER ANALOG VEHICLE MONITORING SYSTEM

(71) Applicant: ASPINITY, INC., Pittsburgh, PA (US)

(72) Inventors: Matthew Zeleznik, Pittsburgh, PA (US); Madhumita Harish, Pittsburgh, PA (US); Brandon David Rumberg, Pittsburgh, PA (US); Thomas Doyle, Laguna Niguel, CA (US); Glen Edward Clark, Wexford, PA (US); Lorenzo Ponzanelli, Bedford, MA (US)

(73) Assignee: ASPINITY, INC., Pittsburgh, PA (US)

( * ) Notice: Subject to any disclaimer, the term of this patent is extended or adjusted under 35 U.S.C. 154(b) by 0 days.

(21) Appl. No.: 18/736,829

(22) Filed: Jun. 7, 2024

(65) Prior Publication Data
US 2025/0214524 A1    Jul. 3, 2025

Related U.S. Application Data

(60) Provisional application No. 63/615,513, filed on Dec. 28, 2023.

(51) Int. Cl.
| | |
|---|---|
| *B60R 21/013* | (2006.01) |
| *G06F 21/32* | (2013.01) |
| *G06V 20/56* | (2022.01) |
| *B60R 21/01* | (2006.01) |
| *B60W 50/00* | (2006.01) |

(52) U.S. Cl.
CPC ............ *B60R 21/013* (2013.01); *G06F 21/32* (2013.01); *G06V 20/56* (2022.01); *B60R 2021/01013* (2013.01); *B60W 2050/0003* (2013.01)

(58) Field of Classification Search
None
See application file for complete search history.

(56) References Cited

U.S. PATENT DOCUMENTS

| | | | | |
|---|---|---|---|---|
| 2021/0097408 | A1* | 4/2021 | Sicconi | G06N 20/00 |
| 2023/0062187 | A1* | 3/2023 | Holland | G06V 20/35 |
| 2024/0193915 | A1* | 6/2024 | Fenlon | G06V 10/764 |
| 2024/0282310 | A1* | 8/2024 | Shibasaki | G10L 17/00 |

OTHER PUBLICATIONS

"PCT Notification of Transmittal of the International Search Report and the Written Opinion of the International Searching Authority", Feb. 6, 2025 (Feb. 6, 2025), for International Application No. PCT/US2024/062251, 11pgs.

* cited by examiner

*Primary Examiner* — Adam D Tissot
*Assistant Examiner* — Laura E Linhardt
(74) *Attorney, Agent, or Firm* — Buckley, Maschoff & Talwalkar LLC

(57) ABSTRACT

Provided is an analog-based machine learning apparatus and method that enables low-power sensing and smarter determinations on a vehicle. As an example, the method may include storing a machine learning model and configuration data for an analog processor in a storage device of a digital processor in a vehicle, receiving, via the analog processor, sensor data from one or more hardware sensors that are communicably coupled to the analog processor, extracting features from the sensor data, determining an event that occurred based on the configuration data and execution of a machine learning model on the extracted features of the sensor data, and storing an identifier of the event in the storage device.

24 Claims, 12 Drawing Sheets

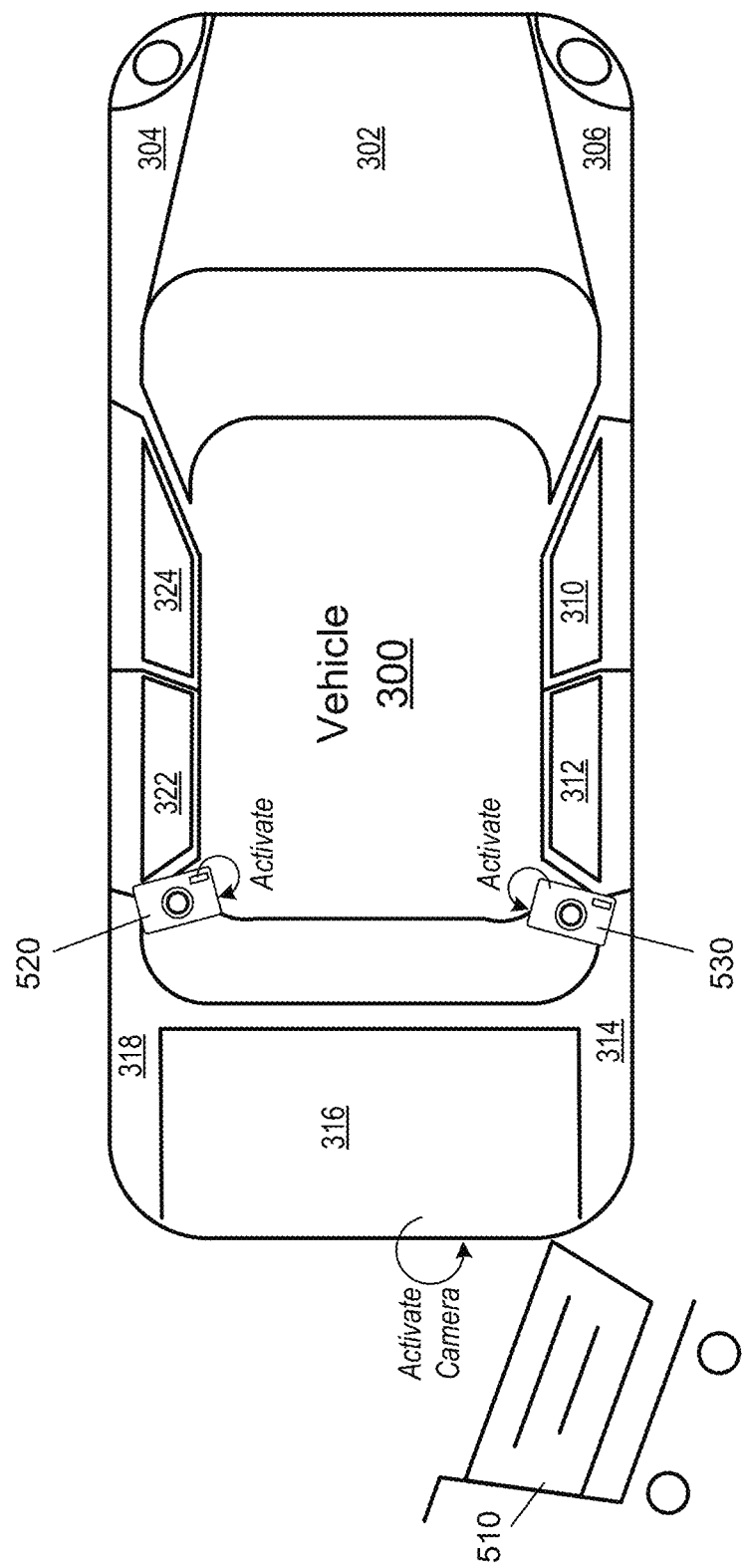

LOW-POWER ANALOG VEHICLE MONITORING SYSTEM

CROSS-REFERENCE TO RELATED APPLICATIONS

The present application claims the benefit of U.S. Provisional Patent Application No. 63/615,513 entitled "ANALOG MACHINE LEARNING PROCESSOR" and filed on Dec. 28, 2023. The entire content of that application is incorporated herein by reference.

BACKGROUND

A smart vehicle is often embedded with different types of sensors (e.g., cameras, LIDAR, radar, engine sensors, brake sensors, pedal sensors, steering wheel sensors, and many others). The sensors capture data both in and around the vehicle and enable many of the smart features of the vehicle. One of the constraints with the sensing systems is that the data from the sensor is always digitized and the signal is always being analyzed in the digital domain. Analysis in the digital domain leads to an increase in the power consumed from the vehicle battery. This is especially significant for vehicles that are powered by rechargeable batteries. As such, there is a need for sensors and a sensing system that provides better intelligence while operating at low power.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIGS. 5A-5B are diagrams illustrating a process of another automated vehicle operation that is triggered based on data sensed by an analog machine learning processor in accordance with example embodiments.

Figure 1A:
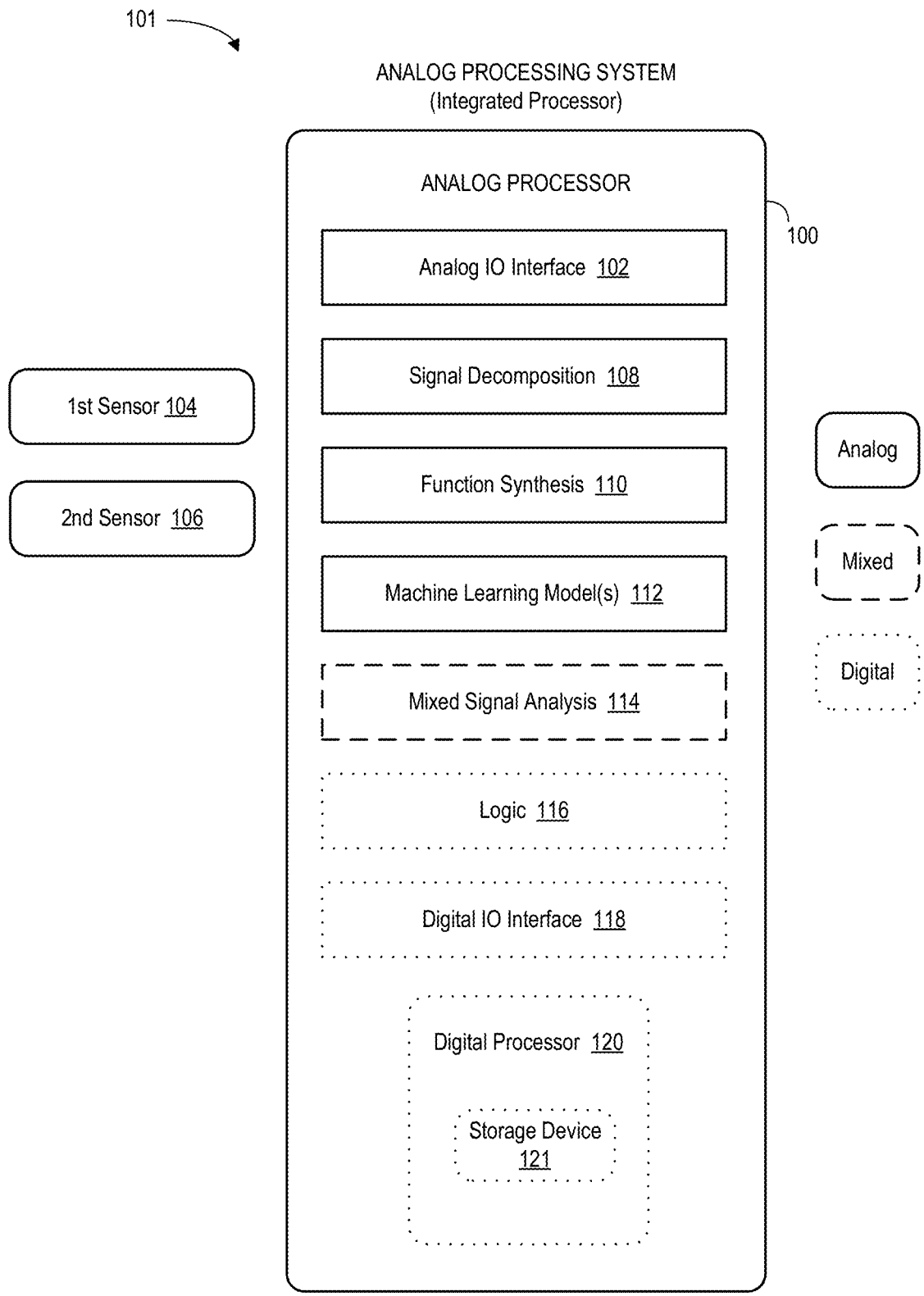
FIG. 1A is a diagram illustrating an analog processing system with an integrated processor in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Digital-based machine learning systems typically must convert sensor data into digital data before executing a machine learning model on the sensor data. This often results in all of the sensor data being converted, even though only a small portion of the sensor data is relevant to the particular use case. The result is an inefficient design that consumes more power than necessary and runs extra operations on the sensor data than is necessary.

The example embodiments are directed to an analog machine learning processor (also referred to herein as an analog machine learning processing system) that relies on an analog circuit instead of a digital circuit. The design of the analog machine learning processor is flexible, programmable, and consumes less power than traditional sensor-based machine learning systems. The analog machine learning processor may include one or more sensors attached to the analog circuit, a microprocessor, a storage element, hardware and software interfaces, signal processing modules, and the like. The sensors may be affixed to the analog circuit providing for efficient sensor integration and communication with a machine learning model(s) stored by the analog machine learning processor.

The analog machine learning processor may be integrated within a system (e.g., a vehicle, a structure, other type of device or system, etc.) and may detect activities that occur with respect to the system. For example, the sensors may capture sensor data of any events that occur in and around a vehicle such as a user placing their hand on a portion of the vehicle, a key scratch being drawn on the vehicle, and the like. As another example, the sensor data may capture events such as impacts that occur from other objects such as vehicles, bikes, car doors, shopping carts, and the like. The sensor data may be processed by the machine learning model to yield actionable results that can be used by the vehicle (e.g., software of the vehicle) to take additional actions with the vehicle.

The analog machine learning processor may be ultra-low power yet provide high-performance solutions. This enables the analog machine learning processor to be turned "on" continuously without using too much power. In fact, a vehicle may be embedded with multipole analog machine learning processors at different parts of the vehicle. When an event is detected, the analog machine learning processor(s)

can then wake up other digital components in the system to perform operations relative to the event.

The machine learning models may be developed using PYTHON® or other programming languages. The machine learning models may be deployed on the analog machine learning processor, a vehicle, a structure, a server, and the like. Algorithms can be loaded into a memory of the analog circuit which can address different types of software applications and use cases. Furthermore, the offset and/or the mismatch of the sensors can be tuned when they are added to the analog circuit, thereby preventing such tuning from needing to be performed later on by a user. The analog machine learning processor provides the low power of an analog circuit, with the versatility, repeatability and usability similar to a digital circuit.

FIG. 1A illustrates an example of an analog processing system 101 with an integrated processor in accordance with an example embodiment. Referring to FIG. 1A, an analog processor 100 (e.g., an analog machine learning processor) may include an analog interface 102 (e.g., an analog Input Output ("IO") interface 102) that is capable of input and output of analog communications with other devices and systems within the vehicle. The analog machine learning processor 100 may be communicably coupled to sensors such as a first sensor 104 and a second sensor 106. The number and type of sensors may vary depending on implementation. As one example, the first sensor 104 may be an audio sensor (e.g., a microphone, etc.) that is capable of listening for and recording sensor data of sounds that occur (e.g., changes in sound, etc.). As another example, the second sensor 106 may include a piezoelectric sensor that is capable of listening for and measuring changes in one or more attributes such as pressure, acceleration, temperature, strain, force, and the like. As another example, a third sensor may include a radar or ultrasonic module which measure changes in object proximity or movement. The sensors may be integrated into a chip or a board of the analog machine learning processor 100. As another example, the sensors may be disposed outside of the board and may be coupled to the board through a cable, wire, plug, etc.

The analog machine learning processor 100 may include a signal decomposition module 108, a function synthesis module 110, one or more machine learning models 112, a mixed signal analysis module 114, programmable logic 116, and a digital interface 118 that is capable of receiving digital communications from other systems and software within the vehicle. The analog machine learning processor 100 also includes a digital processor 120 such as a microprocessor, with a digital storage device 121, that is capable of managing and controlling the operation of the other components within the analog machine learning processor 100. The digital processor 120 may also be attached to the analog circuit and may be coupled to the sensors and other components.

The analog machine learning processor 100 can be configured via software to perform a specific function such as detecting events and waking up other components within the system. For example, a digital processor may be kept in a low power sleep state except for when an analog signal processor detects an event and wakes the digital processor to perform an action (e.g., further analyzing the sensor data, sending a user notification, turning on camera, or any combination of actions). In this way, analog signal processing can be always running at very low power with other high power digital components only running after an event is detected from analog detectors. When the analog machine learning processor 100 detects a relevant event, the digital processor 120 can be enabled from a sleep state to run its own digital model. The digital model can process data from each analog machine learning processor 100 and analyze the data from all sensors 104, 106 to provide further analysis of the event. The configuration of the various components illustrated in FIG. 1A are defined in software and stored in memory on the microcontroller. Furthermore, specific operation and tuning of each analog component is also stored in memory within the microcontroller. The microcontroller communicates the data stored in memory to each of the blocks in FIG. 1A to replicate the functional 'signal' chain developed in software.

In this example, the first sensor 104 and/or the second sensor 106 may sense data in the vehicle, around the vehicle, as an object hits the vehicle, etc. The sensing may be performed while the vehicle is parked and not operating, when the vehicle is on and not operating, when the vehicle is on and moving, and the like. The analog machine learning processor 100 may draw power from the vehicle's battery, engine, and/or other sources including while the vehicle is off. The amount of power consumed is very limited (e.g., ultra-low, etc.) due to the analog design.

Figure 1B:
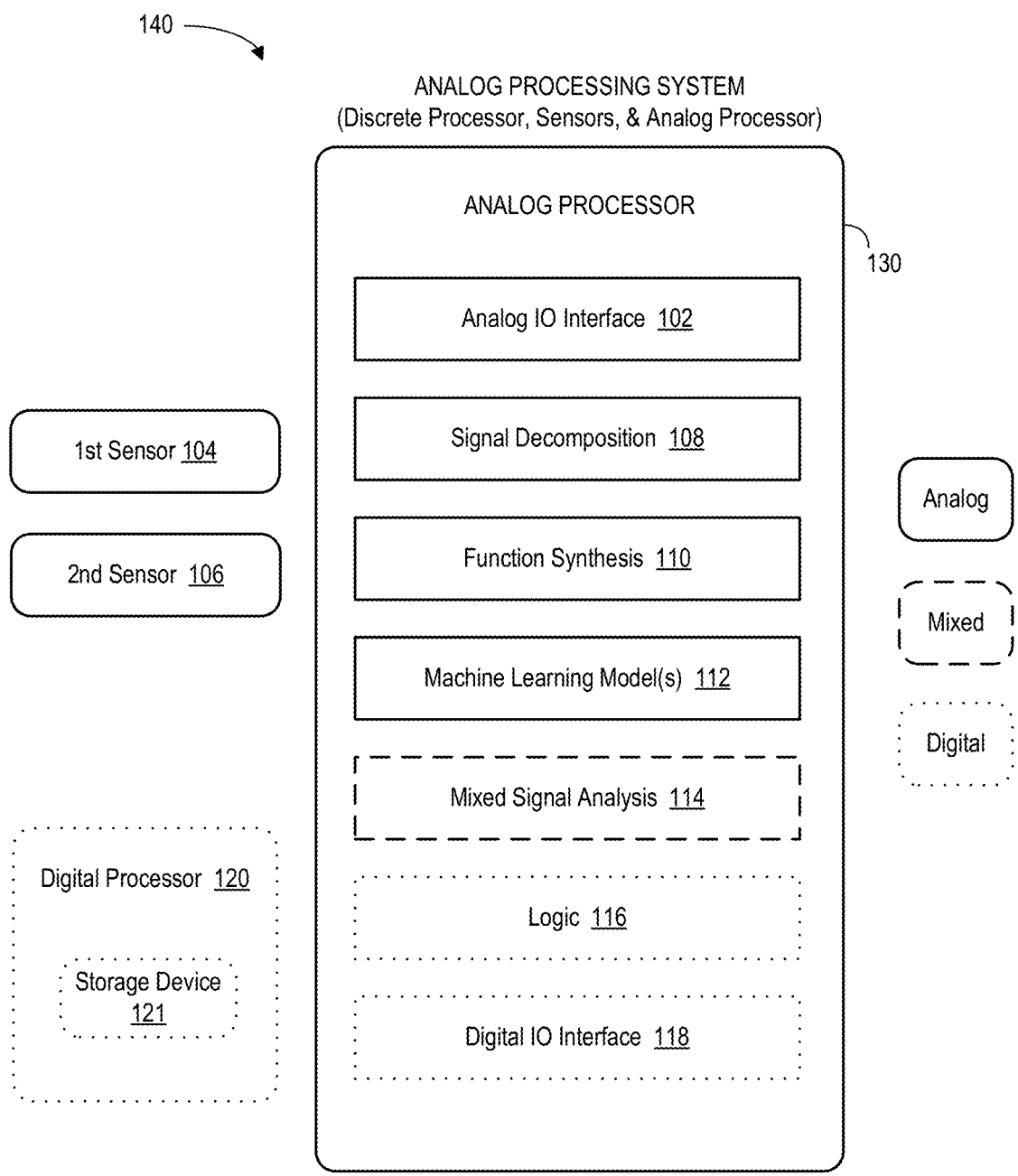
FIG. 1B is a diagram illustrating an analog processing system with a discrete processor, sensors, and analog processor in accordance with another example embodiment.

In the example of FIG. 1A, each of the components are operating on the same processing device. As another example, one or more components may be disposed on a separate processing device and be communicably coupled to the other processing device. For example, FIG. 1B illustrates an example of an analog processing system 140 with a discrete digital processor 120 (with a digital storage device 121), sensors and analog processor 130. The analog processor 130 (e.g., a processing chip) includes some, but not all, of the components of the analog machine learning processor 100 in FIG. 1A. Here, the first sensor 104 and the second sensor 106 are coupled to the processing chip 130 (e.g., through electrical leads, wires, cables, etc.) but are not embedded within the processing chip 130. This enables the first and second sensors 104 and 106 to be integrated into other material such as parts of the vehicle, etc. In this example, the machine learning model is implemented on a separate processing device from the first and second sensors 104 and 106. In this example, the processing chip 130 may receive the sensor data from the first and second sensors 104 and 106 via the remote connection, analyze it, and output it to the machine learning model 112. The machine learning model 112 may perform similar or different functions as the machine learning model within the analog machine learning processor 100.

Figure 2:
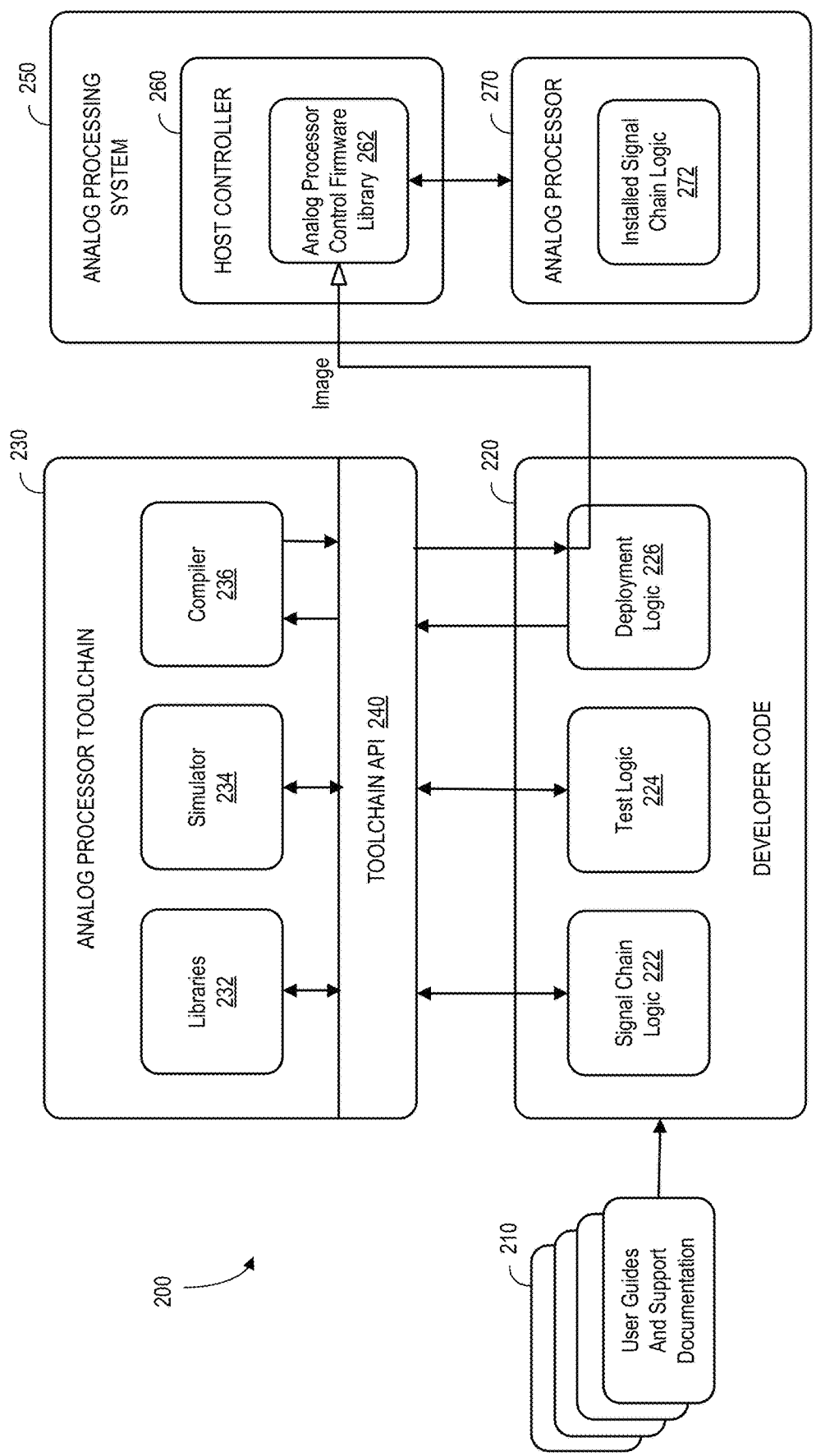
FIG. 2 is a diagram illustrating a process of installing logic onto an analog machine learning processor in accordance with an example embodiment.

FIG. 2 is a diagram illustrating a process 200 of installing logic onto an analog processing system 250 in accordance with an example embodiment. Referring to FIG. 2, a developer may program an analog processing system 250 to perform operations. For example, the developer may program logic into the analog processing system 250 to identify different events, including those associated with vehicles, and the like.

In particular, user guides and support documentation 210 may inform the creation of developer code 220. For example, the developer may compose signal chain logic 222 from elements (e.g., building blocks) found in libraries 232 of an analog processor toolchain 230. The composition actions may be performed via a toolchain API 240 associated with the analog processor toolchain 230. The developer may also write test logic 224 to validate the signal chain logic 222 via a simulator 234 that may also be invoked by the toolchain API 240. In addition, the developer may write deployment logic 226 to generate a "runnable" image for an analog processor 270 target. The compilation action may be performed by a compiler 236 invoked via the toolchain API 240. The compiler 236 may compile code in a programming language, such as PYTHON®. Within the analog processing system 250, an analog processor control firmware library 262 running on a host controller 260 configures the analog processor 270 according to the image to create installed signal chain logic 272. The installed signal chain logic 272 may implement, for example, any of the algorithms described herein.

Figure 3:
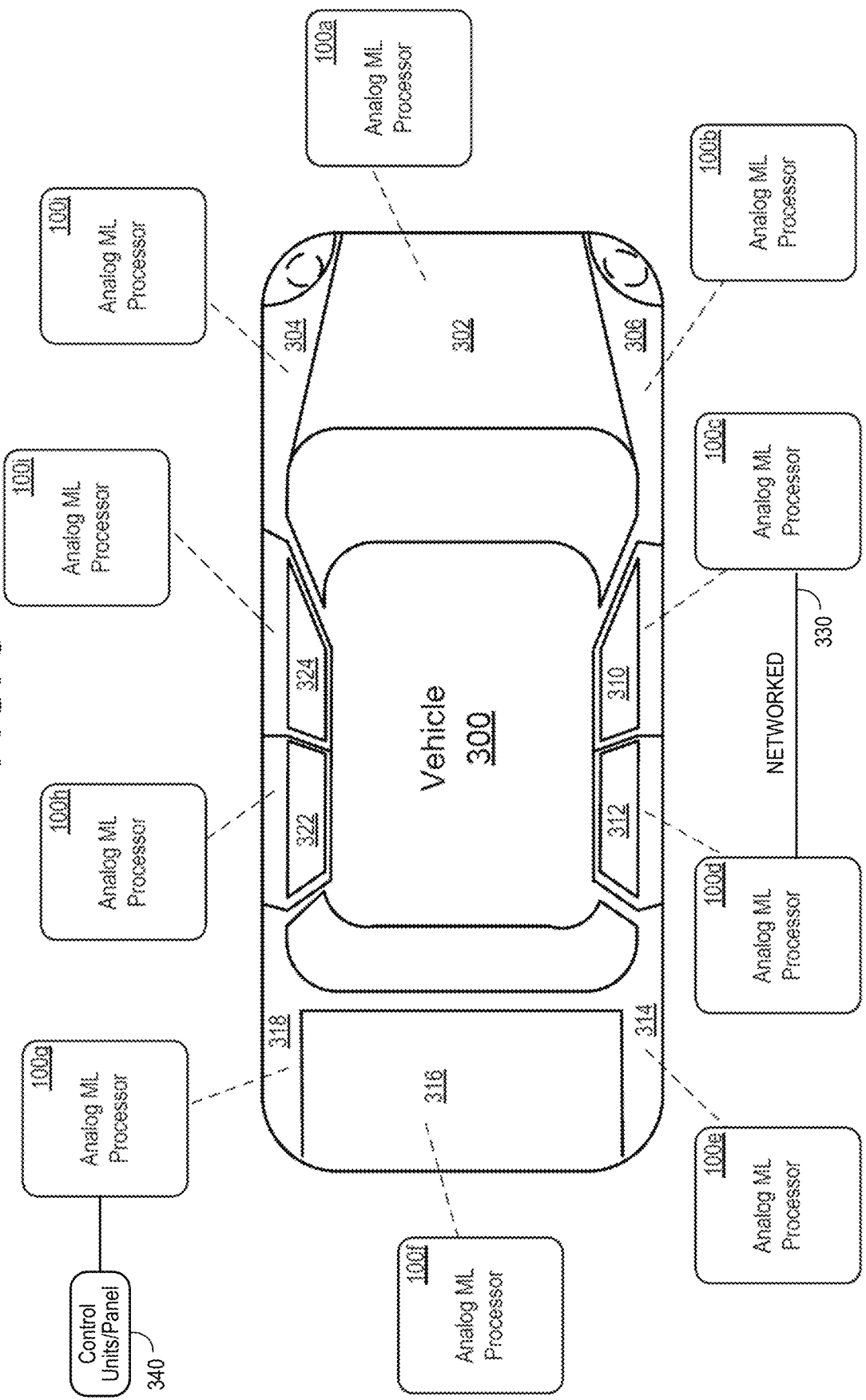
FIG. 3 is a diagram illustrating a vehicle with a plurality of analog machine learning processors embedded therein in accordance with an example embodiment.

FIG. 3 illustrates a vehicle 300 that includes a plurality of analog machine learning processors embedded therein in accordance with an example embodiment. Referring to FIG. 3, an analog machine learning processor (e.g., analog machine learning processors 100a, 100b, 100c, 100d, 100e, 100f, 100g, 100h, 100i, and 100j, etc.). In this example, each analog machine learning processor may be embedded or otherwise integrated or installed into different parts of the vehicle including quarter panels, doors, roof, trunk, bumper, fender, hood, and the like. Each analog machine learning processor 100 may be on at all times and draw power from an energy source of the vehicle 300 such as a battery (not shown). In some embodiments, the battery may be a rechargeable battery. The low power analog design of the analog machine learning processor 100 limits the amount of power that is consumed by the analog machine learning processor. According to some embodiments, some or all of the analog machine learning processors 100 are networked 330 with each other (e.g., elements 100c and 100d in FIG. 3). Moreover, some or all of the analog machine learning processors 100 might integrate with control units and/or a separate control panel 340 of the vehicle 300. For example, the analog control units 100 may connect with indicators (e.g., lights or speakers) to create alerts or warnings.

In this example, an analog machine learning processor 100a is integrated into a hood 302 of the vehicle 300, an analog machine learning processor 100b is integrated into a quarter panel 306 on the passenger side of the vehicle 300, an analog machine learning processor 100c is integrated into a door 310 on the passenger side of the vehicle 300, an analog machine learning processor 100d is integrated into another door 312 on the passenger side of the vehicle 300, and an analog machine learning processor 100e is integrated into another quarter panel 314 on the passenger side of the vehicle 300.

In addition, an analog machine learning processor 100f is integrated into a trunk 316 of the vehicle 300, an analog machine learning processor 100g is integrated into a quarter panel 318 on a driver side of the vehicle 300, an analog machine learning processor 100h is integrated into a door 322 on the driver side of the vehicle 300, an analog machine learning processor 100i is integrated into another door 324 on the driver side of the vehicle 300, and an analog machine learning processor 100j is integrated into another quarter panel 304 on the driver side of the vehicle 300.

In the example of FIG. 3, multiple analog machine learning processors are integrated into a single vehicle. In particular, the multiple analog machine learning processors are integrated into a plurality of parts of the vehicle which provides a high degree of localization. Each part may be monitored separately using a different respective analog machine learning processor. In this scenario the analog machine learning processor has a smaller area to cover and may provide more accuracy. Furthermore, the different analog machine learning processors may include different logic, libraries, and the like, and may perform different tasks.

Although not shown in FIG. 3, as another example, the vehicle may have just one analog machine learning processor that is integrated into the vehicle such as an in-cabin location on the dashboard, etc. The single machine learning processor may include logic for detecting multiple types of events. Here, the single analog machine learning processor may pick up any impact on the vehicle regardless of the location of the impact. When included with a plurality of analog machine learning processors 100, a centrally located processor can receive data from each analog processor 100 and run a model to further analyze data from all analog machine learning processors 100.

Figure 4A:
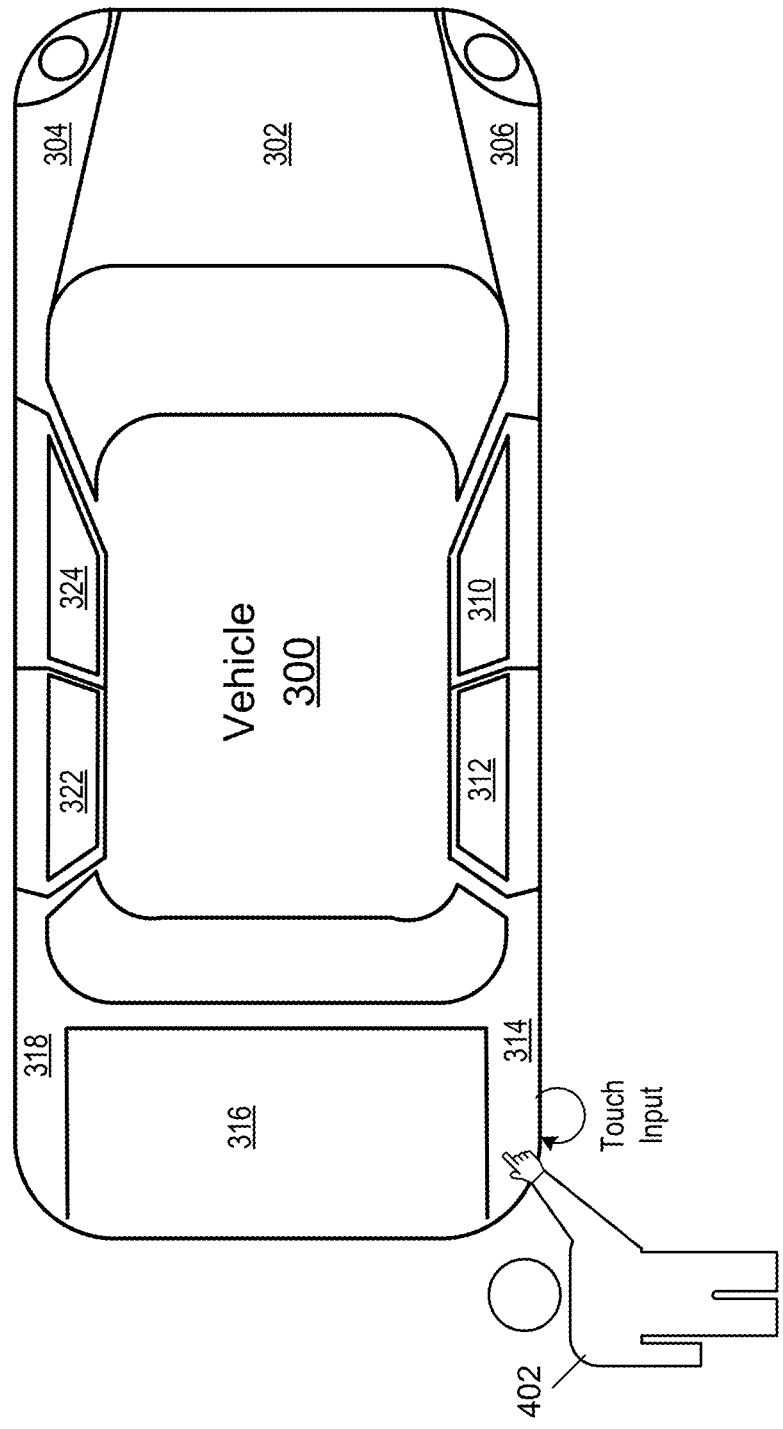
FIGS. 4A-4B are diagrams illustrating a process of an automated vehicle operation that is triggered based on data sensed by an analog machine learning processor in accordance with example embodiments.
Figure 4B:
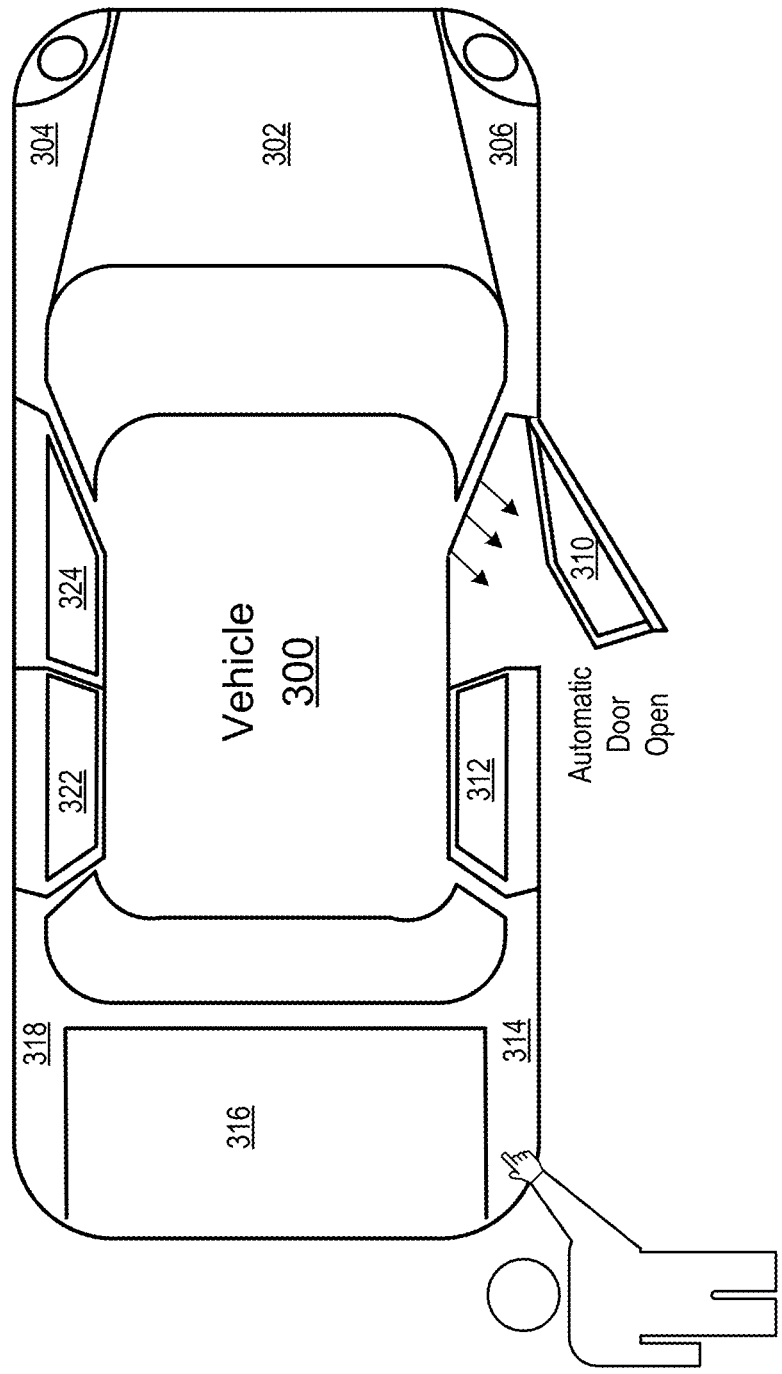

FIGS. 4A-4B illustrate a process of an automated vehicle operation that is triggered based on data sensed by an analog machine learning processor in accordance with example embodiments. For example, FIG. 4A illustrates a process 400A of a person 402 using their hand to touch the quarter panel 314 on the rear passenger side of the vehicle 300. The touch input may be detected by the analog machine learning processor 100e (shown in FIG. 3) which is integrated into the quarter panel 314 of the vehicle. Here, the analog machine learning processor 100e may evaluate sensor data that is captured by one or more sensors of the analog machine learning processor 100e (e.g., sound sensor, piezoelectric sensor, etc.) and determine a type of event that has occurred.

In this example, the analog machine learning processor 100e receives the analog sensor data through the analog sensor interface. Here, the sensor data may be input through the algorithm within the analog machine learning processor which determines the type of event that occurred. For example, the touch input may be analyzed by the one or more libraries 221 shown in FIG. 2 which have parameters associated therewith. The parameters may be identified from a parameter database which includes parameters (e.g., sensor value ranges, etc.) which indicate a type of event. The parameters may indicate if the senor value is above zero but below a certain threshold, the analog machine learning processor 100e may determine that the input is a touch input. If, however, the sensor value is greater, the analog machine learning processor 100e may determine that the input is an impact such as a bike, a car, a shopping cart, a person, an animal, a key scratch, doors opening and closing, and the like. In some embodiments, a trained model may run on the analog machine learning model to classify these variants according to their unique sensor signatures.

In some embodiments, the analog machine learning processor 100e may communicate with a software application that is remote/external from the analog machine learning processor 100e. The software application may be installed within a computer of the vehicle 300 (not shown), a remote server, a user device of an occupant within the vehicle, another vehicle that is external from the vehicle 300, the like. For example, the remote software application may be used to reconfigure the logic of the analog machine learning processor 100e to enable the analog machine learning processor 100e to add additional functions, remove functions, and the like. Furthermore, the remote software application may receive messages from the analog machine learning processor 100c.

FIG. 4B illustrates a process 400B of the vehicle 300 performing an automated operation in response to the detected input. In the example of FIG. 4B, the analog machine learning processor 100e may have an interface that receives the sensor data. Further, the analog machine learning processor 100e may contain its own logic that can analyze the received sensor data, for example, via machine learning. The model(s) may be executed on the sensor data to identify a type of event that occurred, a type of response to perform with the vehicle, whether authentication is necessary, and the like. In this example, the touch input detected by the analog machine learning processor 100e triggers the analog machine learning processor 100e to request the software application to open the door 310 on the front passenger side of the vehicle. It should be appreciated that this is just an example. As another example, the touch input may trigger the trunk to open, a camera to be activated, an authentication screen to be displayed on a user device, and/or the like.

In this example, the analog machine learning processor 100e attempts to identify a particular touch impact. This is just merely one example. The logic within the analog machine learning processor may be customized to detect a custom sequence of action such as a touch and a voice command that are performed in sequence, etc. Here, the training of the machine learning model may cause the model to learn the logic associated with the custom sequence of events. Thus, the training can integrate the pattern into the model. As another example, a rule set could be stored and used by the system.

Figure 5A:
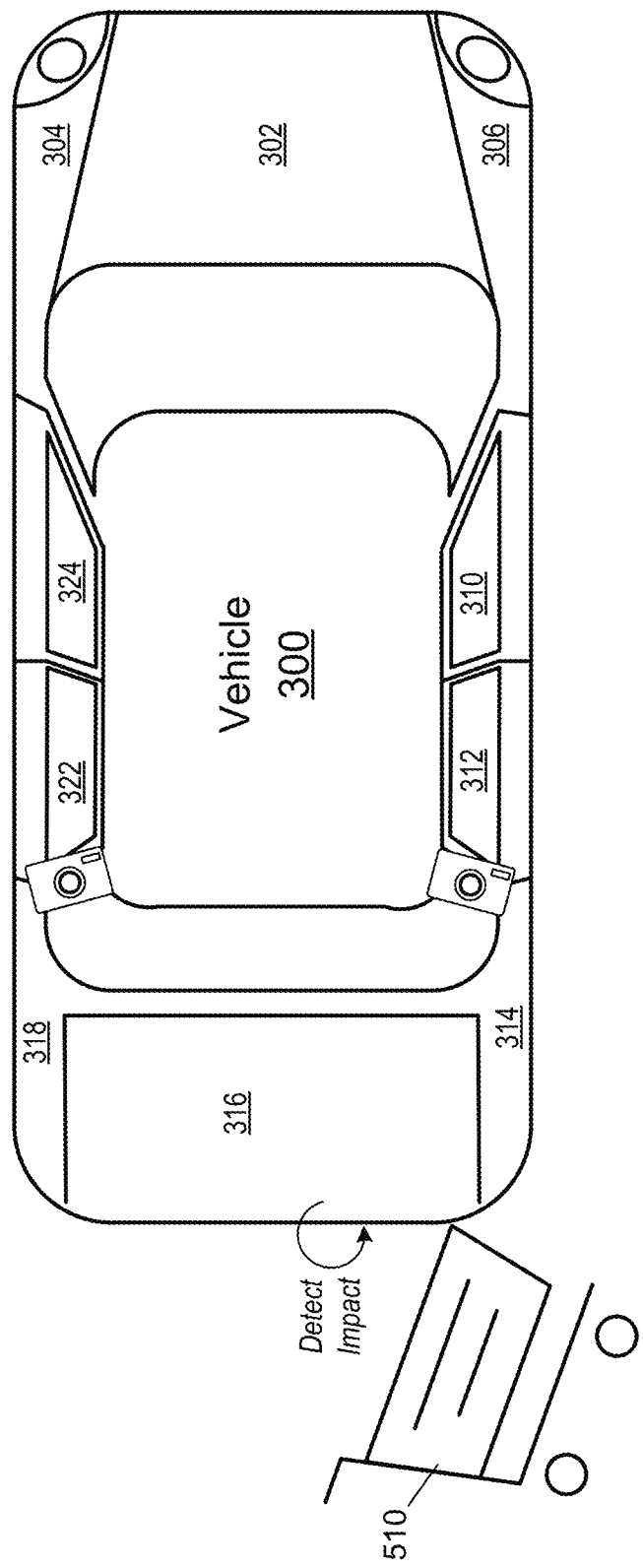

FIGS. 5A-5B are diagrams illustrating a process of another automated vehicle operation that is triggered based on data sensed by an analog machine learning processor in accordance with example embodiments. For example, FIG. 5A illustrates a process 500A of a shopping cart 510 rolling into the trunk 316 of the vehicle 300. The impact from the shopping cart 510 may be detected by the analog machine learning processor 100f (shown in FIG. 3A) which is integrated into trunk 316 of the vehicle 300. Here, the analog machine learning processor 100f may evaluate sensor data that is captured by one or more sensors of the analog machine learning processor 100f (e.g., sound sensor, piezoelectric sensor, etc.) and determine a type of event that has occurred.

In this example, the analog machine learning processor 100f may compare a sound detected by the sound sensor and/or a pressure sensed by the piezoelectric sensor to detect that an impact has occurred that may cause damage to the vehicle 300. The severity of the impact may be identified from a parameter database which includes parameters (e.g., sensor value ranges, etc.) which indicate a type of event. For example, the parameters may indicate if the sound value is above a first threshold but below a second threshold, the analog machine learning processor 100f may determine that the input is an impact and should turn on a camera of the vehicle to record any possible clues as to the cause of the damage.

For example, FIG. 5B illustrates a process 500B of activating an external camera in response to the detected impact to the trunk 316 of the vehicle 300. In this example, the analog machine learning processor 100f may contain its own logic that can analyze the sensor data, for example, via machine learning. The model(s) may be executed on the sensor data to identify a type of event that occurred, a type of response to perform with the vehicle, whether authentication is necessary, and the like. In this example, the impact from the shopping cart 510 detected by the analog machine learning processor 100f triggers the analog machine learning processor 100f to request the software application to activate two rear cameras 520 and 530 installed on an exterior of the vehicle 300. It should be appreciated that this is just an example. As another example, different types of sensors, multiple types of sensors, and the like, may be triggered based on a detected impact. In some embodiments, multiple cameras may be triggered. However, another example is that the software application may only activate a camera that is nearest to the detected impact. Thus, the camera activation can be localized to where the impact occurred on the vehicle 300.

Figure 6:
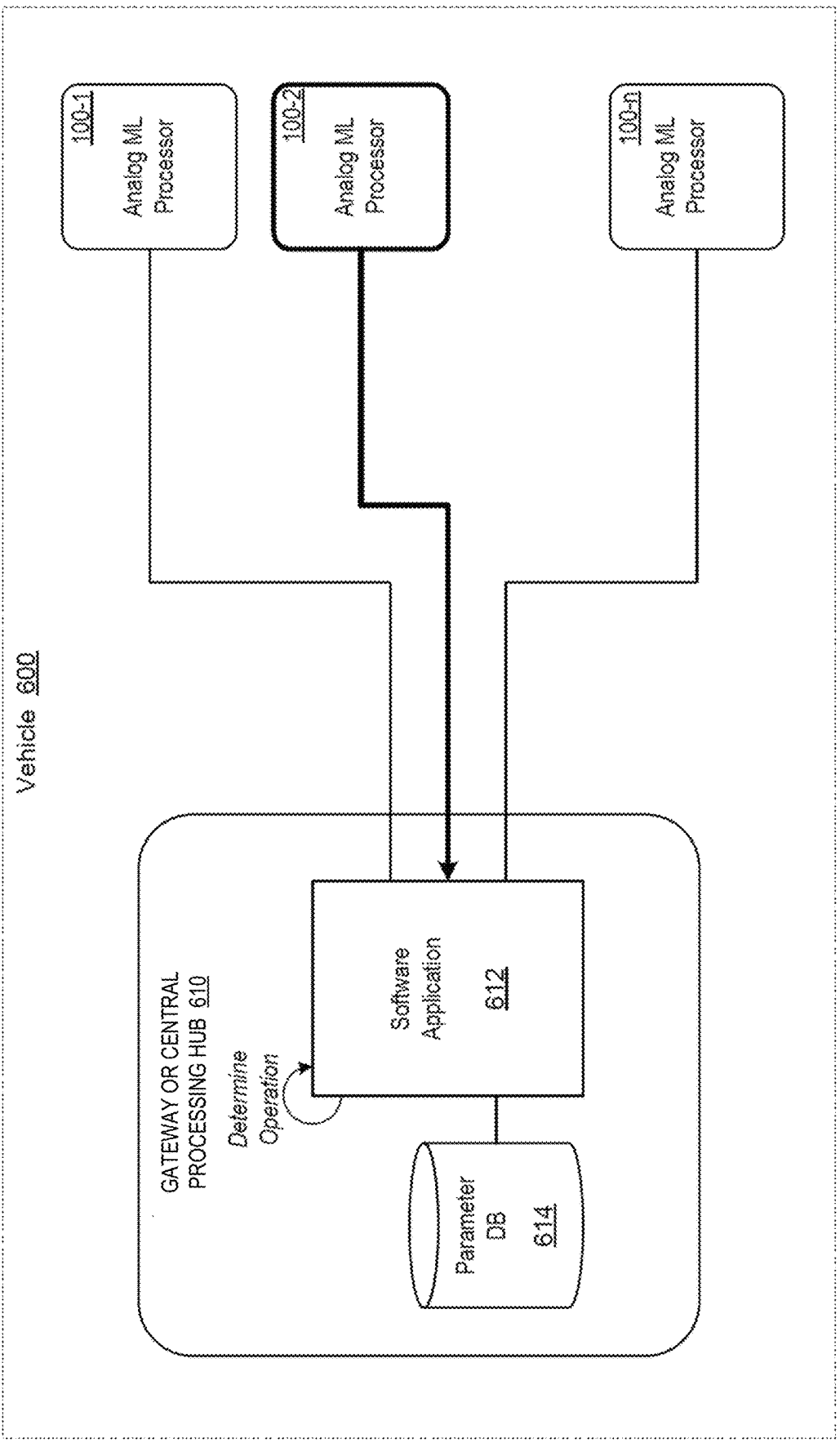
FIG. 6 is a diagram illustrating an integration of analog machine learning processors within a vehicle system in accordance with example embodiments.

FIG. 6 illustrates a logical architecture of a vehicle 600 in accordance with example embodiments. Referring to FIG. 6, the vehicle 600 includes a gateway or central processing hub 610 (e.g., a vehicle computer) with a software application 612 installed therein. The software application 612 may have different functions, features, methods, commands, and the like, depending on the implementation. In this example, the hub 610 also includes a parameter database 614 with identifiers of sensor ranges that correspond to different events that can be detected by the analog machine learning processor described herein. The hub 610 might also be configured to provide wireless communication to external devices, such as a mobile device or laptop.

In this example, the vehicle 600 also includes a plurality analog machine learning processor 100-1, 100-2, . . . 100-n that are integrated into different locations on the vehicle 600 and which are communicably coupled to the hub 610. The plurality of analog machine learning processors 100-1, 100-2, . . . 100-n may be configured to perform different tasks with respect to each other. For example, one analog machine learning processor may detect a key scratch on a particular location on the vehicle while another detects whether any part of the vehicle has been in a collision/more severe impact. In this example, any of the analog machine learning processor may send a trigger or other command to the hub 610 to wake the device from a low power sleep state. The software application 612 subsequently runs in response to a detected event. The software application 612 may receive the trigger request, run its own machine learning model, compare all sensor data within the request to sensor ranges stored within the parameter database 614 to identify a type of impact that has occurred (e.g., touch, cart, vehicle, etc.) Furthermore, the software application 612 may provide communication to user devices or activate one or more systems, sub-systems, doors, engine, brakes, and the like based on commands sent from any of the analog machine learning processors.

Figure 7:
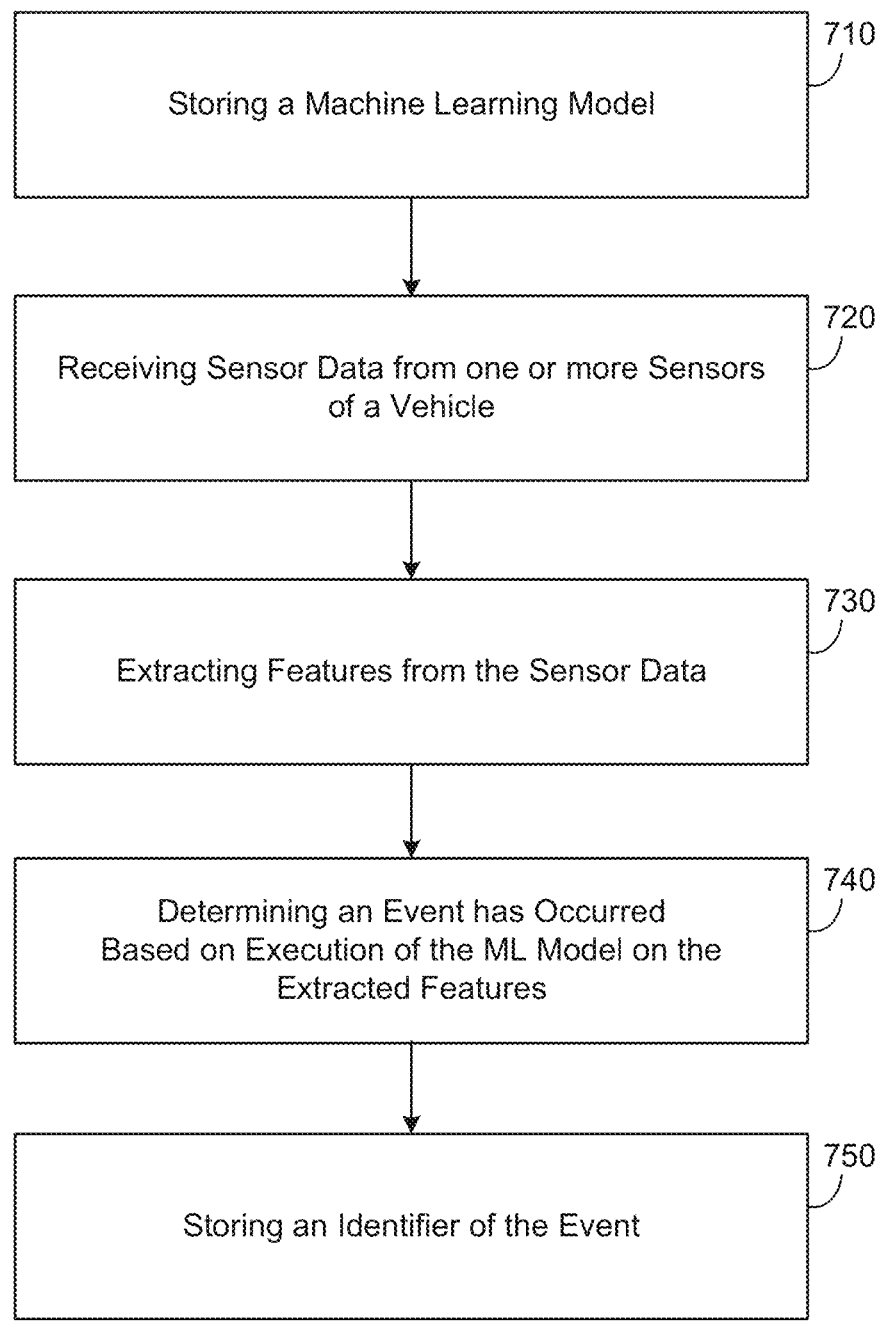
FIG. 7 is a diagram illustrating a method of identifying an event based on sensed data in accordance with an example embodiment.

FIG. 7 illustrates a method 700 of identifying an event (e.g., associated with executing an automated vehicle operation) based on sensed data in accordance with an example embodiment. For example, the method 700 may be executed by an analog machine learning processor, a software application, a vehicle, a combination of systems, and the like. Referring to FIG. 7, in 710, the method may include storing a machine learning model in a storage device of a vehicle. The machine learning model may include one or more algorithms for analyzing sensor data and determining an event that has occurred such as an impact to the vehicle, a part of the vehicle that is impacted, a type of impact, and the like. Based on this data, the system may perform additional operations.

In 720, the method may include receiving sensor data from one or more sensors of a vehicle. The vehicle sensors might be associated with, by way of example only, a camera, a LIDAR sensor, a radar sensor, an engine sensor, a brake sensor, a pedal sensor, a steering wheel sensor, an audio sensor, a piezoelectric sensor, an accelerometer, a gyroscope, an IMU sensor, etc. These sensors may connect directly to the analog machine learning processor. The sensors may be analog or digital and may transduce the sensed phenomena to a voltage, current, charge, or other electrical quantity. In any case, the analog machine learning processor may be programmed to convert the sensor signals to the required electrical forms for processing.

In 730, the method may include extracting features for the machine learning model from the received sensor data. In some embodiments, the features computed in the analog machine learning processor may include logarithmic filter bank energies, envelope modulation rates, zero-crossing rates, or features that are trained as part of the machine learning model. When multiple sensors are used, the features of all sensors may be concatenated as a single feature vector. In 740, the method may include determining an event that occurred based on execution of a machine learning model on the features of the sensor data. In some embodiments, the machine learning model may process a time sequence of feature vectors from 730. The layers of the machine learning model 740 that run in the analog machine learning processor may include common layers, such as fully-connected, convolutional, or recurrent layers. A multi-class model may be used with a dedicated output for event or multiple independent models may run for each event. In 750, the method may include storing an identifier of the event in the storage device. While the method shows the steps as being performed in an order, it should be appreciated that the method is not limited to this order and the steps may be performed in a different order. For example, the sensor data from the piezoelectric sensor may be received at the same time or after the system receives the sensor data from the audio sensor.

In some embodiments, the method may further include transmitting an identifier of the determined event to a computing system of the vehicle via an interface. In some embodiments, the method may further include transmitting a request to a software application to authenticate a user with a biometric scan based on the determined event. In some embodiments, the method may further include transmitting a message to a software application to activate an external camera based on the determined event. In some embodiments, the method may further include transmitting a message to a software application to open an automated door on a vehicle based on the determined event. In some embodiments, the method may further include determining an operation to perform with the vehicle based on the sensor data sensed by the piezoelectric sensor and the sensor data sensed by the sound sensor via the software application and executing the operation via the vehicle. For example, the system may be communicably coupled to a control unit of the vehicle such that the alarm system may be triggered by a detected event or the car lights may flash to indicate to a prowler that the vehicle is actively monitoring.

Figure 8:
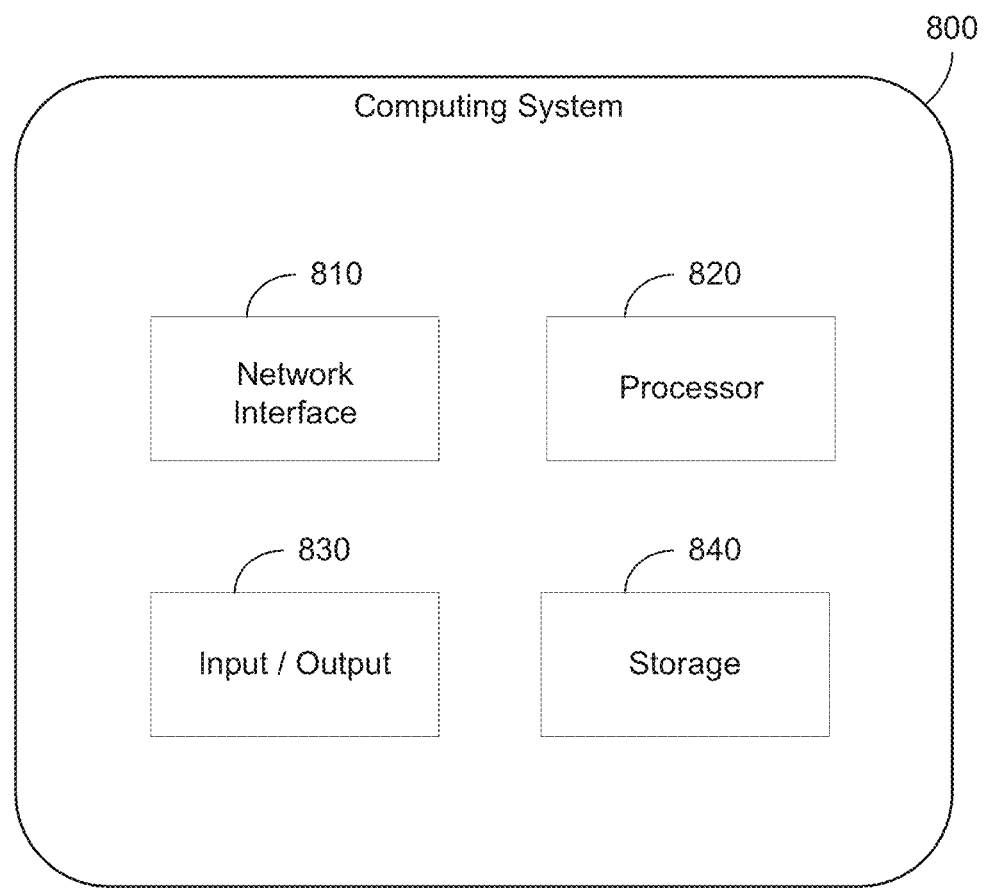
FIG. 8 is a diagram illustrating a computing system for use with the examples described herein in accordance with an example embodiment.

FIG. 8 illustrates a computing system 800 that may be used in any of the methods and processes described herein, in accordance with an example embodiment. For example, the computing system 800 may be a vehicle computer, a server, a cloud platform, or the like. In some embodiments, the computing system 800 may be distributed across multiple computing devices such as multiple database nodes. Referring to FIG. 8, the computing system 800 includes a network interface 810, a processor 820, an input/output 830, and a storage 840 such as an in-memory storage, and the like. Although not shown in FIG. 8, the computing system 800 may also include or be electronically connected to other components such as a display, an input unit(s), a receiver, a transmitter, a persistent disk, and the like. The processor 820 may control the other components of the computing system 800.

The network interface 810 may transmit and receive data over a network such as the Internet, a private network, a public network, an enterprise network, and the like. The network interface 810 may be a wireless interface, a wired interface, or a combination thereof. The processor 820 may include one or more processing devices each including one or more processing cores. In some examples, the processor 820 is a multicore processor or a plurality of multicore processors. Also, the processor 820 may be fixed or it may be reconfigurable. The input/output 830 may include an interface, a port, a cable, a bus, a board, a wire, and the like, for inputting and outputting data to and from the computing system 800. For example, data may be output to an embedded display of the computing system 800, an externally connected display, a display connected to the cloud, another device, and the like. The network interface 810, the input/output 830, the storage 840, or a combination thereof, may interact with applications executing on other devices.

The storage 840 is not limited to a particular storage device and may include any known memory device such as RAM, ROM, hard disk, and the like, and may or may not be included within a database system, a cloud environment, a web server, or the like. The storage 840 may store software modules or other instructions which can be executed by the processor 820 to perform the methods described herein. According to various embodiments, the storage 840 may include a data store having a plurality of tables, records, partitions and sub-partitions. The storage 840 may be used to store database records, documents, entries, and the like. As another example, the storage 840 may include a code repository that is configured to store source code files of computer programs including APIs.

Figure 9:
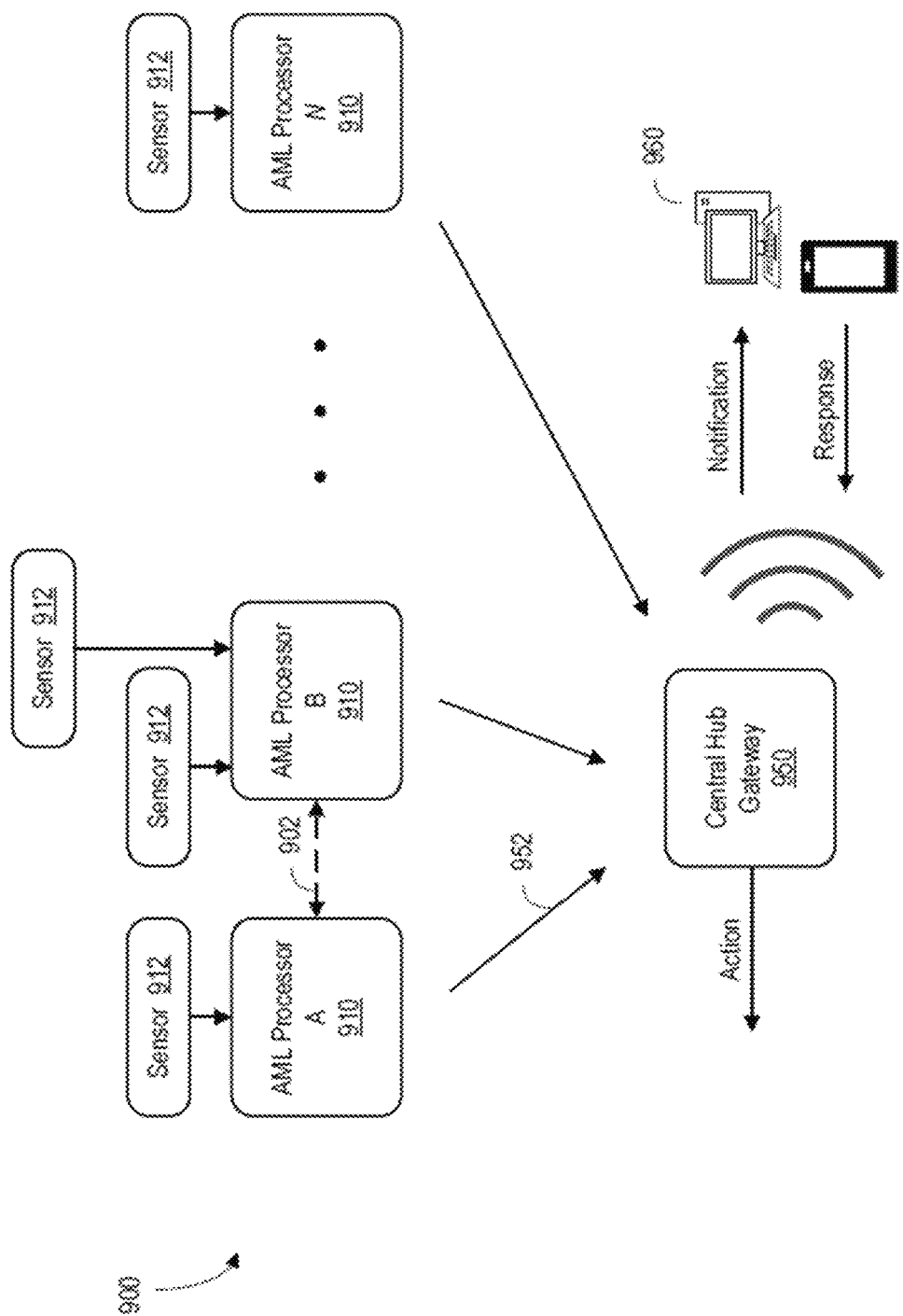
FIG. 9 is a system according to some embodiments.

FIG. 9 is a system 900 according to some embodiments. The system 900 may be, for example, associated with a vehicle and include a plurality of analog processors (e.g., Analog Machine Learning ("AML") processors A through N) 910 and associated sensors 912. A central hub gateway 950 may receive information from each of the plurality of analog processors 910. The central hub gateway 950 may be a uniquely configured analog machine learning processor. The analog processors 910 might communicate via a wired or wireless connection 952, such as a Controller Area Network ("CAN") bus or other protocol. According to some embodiments, the analog processors 910 may also communicate with each other via a connection 902 such as a Bluetooth Low Energy ("BLE") protocol, a Z Wave wireless communication protocol, a Zigbee Institute of Electrical and Electronics Engineers ("IEEE") 802.15.4 based specification, etc. According to some embodiments, the central hub gateway 950 may also push notifications to a user device 960 associated with the vehicle. The central hub gateway 950 may, according to some embodiments, arrange for a vehicle action to be performed (e.g., based on a received response to a notification from the user device 960). This network of analog machine learning processors 910 allows localized sensing around the vehicle to be centrally understood at the hub gateway 950. The analog machine learning processors 910 communicate summary information to the hub 950, enabling the hub 950 to operate at a higher abstraction level, thereby saving energy by not communicating or processing unnecessary data. In some embodiments, the information provided by the analog machine learning processors 910 may be event-based and include model's confidence levels for predicting each class as well as metadata about the event, such as the features computed in 730 or generic signal descriptions—wideband (peak and total rms) or spectral (spectral centroid and spectral flatness)—for each sensor channel during the event. The analog machine learning processors 910 may also periodically communicate information about the non-event environmental background metadata (e.g., the same metadata that are communicated for each event). In some embodiments, the hub 950 may utilize the information from all analog machine learning processors 910 to localize contacts to the vehicle body. For example, the relative energy of vibration signals from each processor node may indicate the position of the contact. In other embodiments, the model predictions from each analog machine learning processor 910 may be combined to more accurately classify events through a simple voting method or through machine learning techniques like AdaBoost that train on an ensemble of learners to achieve higher accuracy. In some embodiments, the hub 950 may run a digital machine learning model (such as a neural network or a decision tree) on the signal metadata provided by the nodes. In some embodiments, the hub gateway 950 may employ acoustic scene analysis techniques to group events over time to provide a more meaningful view of what is happening. For example, if the system detects that a basketball bounced on the roof and then on the hood, then the hub 950 may group these as a sequence of related events to track the path of the ball and where it likely originated from. In some embodiments, the background metadata from the nodes may be used to identify the environment around the vehicle (e.g., next to a busy street, in a parking lot, in a driveway, etc.) which can be used to change the machine learning models that are deployed in the analog machine learning processors 910 or to modify the vigilance level of monitoring.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), cloud storage, and the like.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system, comprising:
    a digital processor communicably coupled to a storage device storing a machine learning model and configuration data for an analog processor; and
    the analog processor communicably coupled to the digital processor and one or more hardware sensors, the analog processor being configured to receive sensor data sensed by the one or more hardware sensors and operate on the sensor data via analog circuitry, without relying on digital circuitry, using installed signal chain logic to implement an analog algorithm and extract features from the sensor data, and determine that an event occurred based on the configuration data and execution of the machine learning model, executed via the analog circuitry, on the extracted features from the sensor data, wherein the system is embedded within an automobile.

2. The system of claim 1, further comprising an interface configured to transmit an identifier of the determined event.

3. The system of claim 1, wherein a request is transmitted to a software application that initiates an action in response to the request.

4. The system of claim 3, wherein the initiated action is to perform at least one of: (i) authenticating a user with a biometric scan based on the determined event, (ii) activating an external camera based on the determined event, and (iii) opening an automated door on the automobile based on the determined event.

5. The system of claim 1, wherein a type of impact to the automobile is determined based on the execution of the machine learning model on the sensor data.

6. The system of claim 1, wherein at least one hardware sensor is associated with at least one of: (i) a camera, (ii) a Light Detection and Ranging ("LIDAR") sensor, (iii) a radar sensor, (iv) an engine sensor, (v) a brake sensor, (vi) a pedal sensor, (vii) a steering wheel sensor, (viii) an audio sensor, (ix) a piezoelectric sensor, (x) an accelerometer, (xi) a gyroscope, (xii) an ultrasonic sensor, and (xiii) an Inertial Measurement Unit ("IMU") sensor.

7. The system of claim 1, wherein a digital component is kept in a low power sleep state until the analog processor determines that the event has occurred and a wake-up signal is transmitted to the digital component.

8. The system of claim 1, wherein a plurality of analog processors and associated sensors are distributed with in the automobile, further comprising:
    a central hub gateway to receive information from each of the plurality of analog processors and analyze sensor and analog processor data from each of the plurality of analog processors.

9. The system of claim 8, wherein the plurality of analog processors communicate with the central hub gateway via a wireless connection.

10. The system of claim 9, wherein the central hub gateway pushes notifications to a user device.

11. The system of claim 10, wherein the central hub gateway receives a response to a notification from the user device and arranges for an automobile action to be performed.

12. An automobile comprising:
    a digital processor communicably coupled to a storage device storing a machine learning model and configuration data for an analog processor; and the analog processor communicably coupled to the digital processor and one or more hardware sensors, the analog processor being configured to receive sensor data sensed by the one or more hardware sensors and operate on the sensor data via analog circuitry, without relying on digital circuitry, using installed signal chain logic to implement an analog algorithm and extract features from the sensor data, and determine that an event occurred based on the configuration data and execution of the machine learning model, executed via the analog circuitry, on the extracted features from the sensor data.

13. The automobile of claim 12, wherein an identifier of the determined event is transmitted to a software application that initiates an action in response to receiving the identifier.

14. The automobile of claim 13, wherein the initiated action is to perform at least one of: (i) authenticating a user with a biometric scan based on the determined event, (ii) activating an external camera based on the determined event, and (iii) opening an automated door on the automobile based on the determined event.

15. The automobile of claim 12, wherein a type of impact to the automobile is determined based on the execution of the machine learning model on the sensor data, and the determined type of impact is transmitted to a software application.

16. The automobile of claim 15, wherein at least one hardware sensor is associated with at least one of: (i) a camera, (ii) a Light Detection and Ranging ("LIDAR") sensor, (iii) a radar sensor, (iv) an engine sensor, (v) a brake sensor, (vi) a pedal sensor, (vii) a steering wheel sensor, (viii) an audio sensor, (ix) a piezoelectric sensor, (x) an accelerometer, (xi) a gyroscope, (xii) an ultrasonic sensor, and (xiii) an Inertial Measurement Unit ("IMU") sensor.

17. A method comprising:
  storing a machine learning model and configuration data for an analog processor in a storage device of a digital processor in an automobile;
  receiving, via the analog processor, sensor data from one or more hardware sensors that are communicably coupled to the analog processor;
  extracting features from the sensor data and operate on the sensor data via analog circuitry, without relying on digital circuitry, using installed signal chain logic to implement an analog algorithm and extract features from the sensor data;
  determining that an event occurred based on the configuration data and execution of the machine learning model, executed via the analog circuitry, on the extracted features of the sensor data; and
  storing an identifier of the event in the storage device.

18. The method of claim 17, further comprising transmitting an identifier of the determined event to a computing system of the automobile via an interface.

19. The method of claim 18, further comprising transmitting a request to a software application that initiates an action in response to the request.

20. The method of claim 19, wherein the initiated action is to perform at least one of: (i) authenticating a user with a biometric scan based on the determined event, (ii) activating an external camera based on the determined event, and (iii) opening an automated door on the automobile based on the determined event.

21. The system of claim 1, wherein the sensor data received by the analog processor comprises analog sensor data that has not been converted into digital sensor data.

22. The system of claim 1, wherein the extraction of the features from the sensor data by the analog processor includes: (i) logarithmic filter bank energies, (ii) envelope modulation rates, (iii) zero-crossing rates, and (iv) features that are trained as part of the machine learning model.

23. The system of claim 1, wherein extraction of the features from the sensor data by the analog processor includes concatenating features of multiple sensors into a single feature vector.

24. The system of claim 23, wherein the machine learning model processes a time sequence of feature vectors using common layers that include: (i) fully-connected layers, (ii) convolutional layers, and (iii) recurrent layers.

* * * * *